(12) United States Patent  
Jansen et al.

(10) Patent No.: US 7,839,049 B2
(45) Date of Patent: Nov. 23, 2010

(54) STATOR AND STATOR TOOTH MODULES FOR ELECTRICAL MACHINES

(75) Inventors: Patrick L. Jansen, Scotia, NY (US); Ronghai Qu, Clifton Park, NY (US); Aniruddha D. Gadre, Rexford, NY (US)

(73) Assignee: General Electric Company, Schenectady, NY (US)

( * ) Notice: Subject to any disclaimer, the term of this patent is extended or adjusted under 35 U.S.C. 154(b) by 323 days.

(21) Appl. No.: 11/947,052

(22) Filed: Nov. 29, 2007

(65) Prior Publication Data

US 2009/0140526 A1   Jun. 4, 2009

(51) Int. Cl.
*H02K 1/22*   (2006.01)

(52) U.S. Cl. .................. 310/266; 310/194; 310/413

(58) Field of Classification Search .................. 310/266, 310/112–114, 194, 202, 208, 413
See application file for complete search history.

(56) References Cited

U.S. PATENT DOCUMENTS

| 3,602,749 A * | 8/1971 | Esters ................... 310/154.21 |
|---|---|---|
| 5,481,143 A * | 1/1996 | Burdick ..................... 310/68 B |
| 6,590,312 B1 | 7/2003 | Seguchi et al. |
| 6,762,525 B1 * | 7/2004 | Maslov et al. ............... 310/112 |
| 6,794,781 B2 | 9/2004 | Razzel et al. |
| 6,803,696 B2 * | 10/2004 | Chen ......................... 310/268 |
| 6,992,419 B2 * | 1/2006 | Kim et al. .................... 310/266 |
| 7,154,193 B2 | 12/2006 | Jansen et al. |
| 7,356,906 B2 * | 4/2008 | Kim et al. ..................... 29/596 |
| 2004/0041409 A1 | 3/2004 | Gabrys |
| 2004/0135461 A1 | 7/2004 | Miyake et al. |
| 2004/0195929 A1 | 10/2004 | Oshidari et al. |
| 2004/0239199 A1 | 12/2004 | Qu et al. |
| 2006/0131985 A1 | 6/2006 | Qu et al. |

FOREIGN PATENT DOCUMENTS

DE  4023791 A1  1/1992
WO  99/39426 A1  8/1999

* cited by examiner

*Primary Examiner*—Thanh Lam
(74) *Attorney, Agent, or Firm*—James W. Pemrick; Ernest G. Cusick; Frank A. Landgraff

(57) ABSTRACT

An electrical machine comprising a rotor and a stator is provided. The stator includes a plurality of stator tooth modules configured for radial magnetic flux flow. The stator tooth modules include at least one end plate, and the end plates have extensions for mounting onto a stator frame. The stator is concentrically disposed in relation to the rotor of the electrical machine.

25 Claims, 7 Drawing Sheets

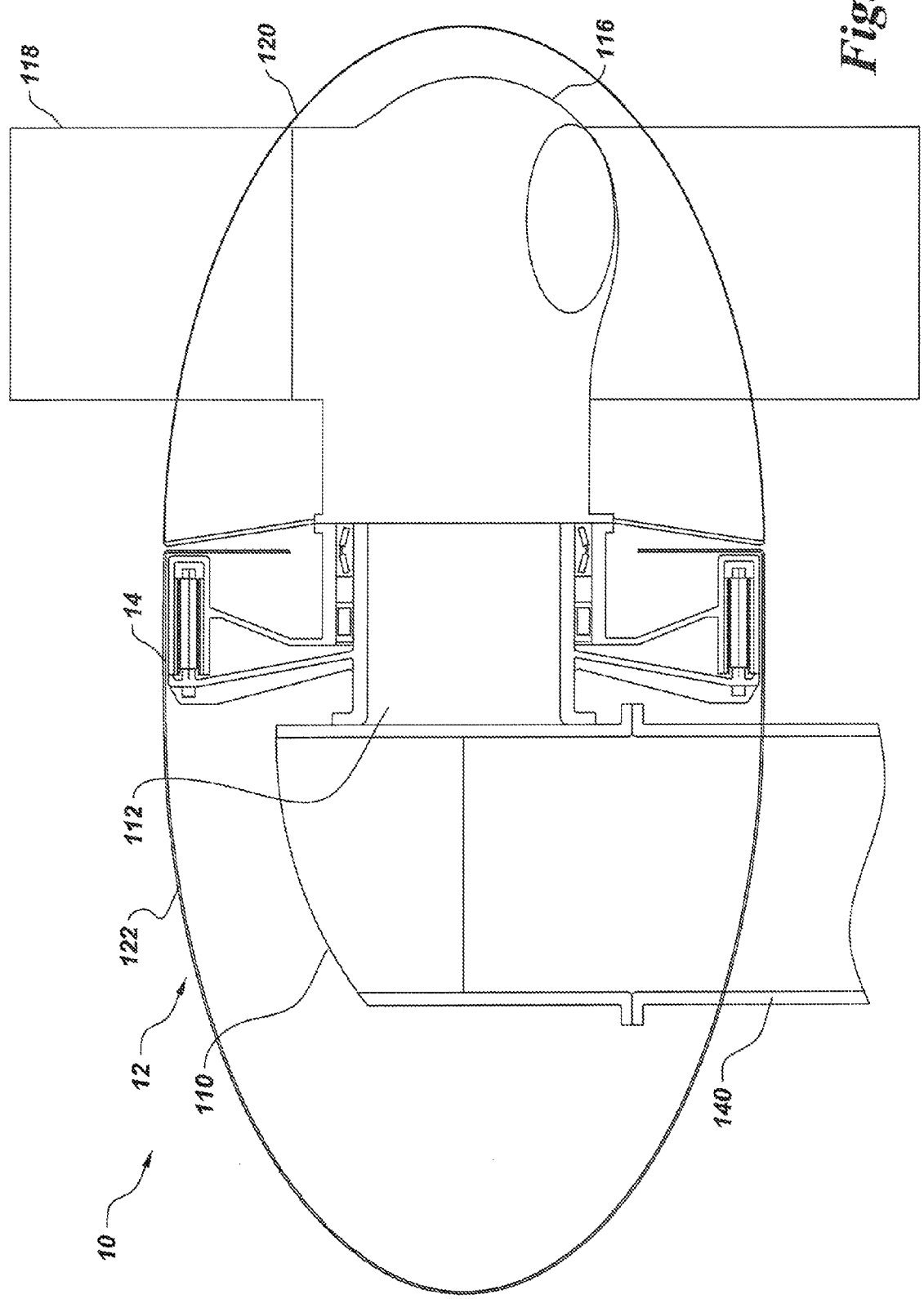

STATOR AND STATOR TOOTH MODULES FOR ELECTRICAL MACHINES

BACKGROUND OF THE INVENTION

The invention relates generally to radial flux electrical machines and more specifically to an electrical machine with a stator having modular stator teeth.

Electrical machines, i.e. generators and motors, are devices that transform mechanical power into electrical power, and vice-versa. Electrical machines for power generation, transmission and distribution provide power for industrial, business and residential requirements. For example, wind turbines are used to convert the kinetic energy in the wind into mechanical power. This mechanical power may be used for specific tasks (such as grinding grain or pumping water) or a generator may convert this mechanical power into electricity. A wind turbine usually includes an aerodynamic mechanism for converting the movement of air into a mechanical motion, which is then converted with a generator into electrical power.

The majority of commercially available wind turbines utilize geared drive trains to connect the turbine blades to the wind generators. The wind turns the turbine blades, which rotate a shaft, which feeds into a gear-box and then connects to a wind generator and makes electricity. The geared drive aims to increase the velocity of the mechanical motion. The drawback of a geared drive is that it reduces the reliability of the wind turbine and increases the noise and cost of the wind turbine.

A few wind turbines utilizing direct-drive generators are also commercially available. Due to the low speed operation (due to the absence of a gearbox), these generators tend to be very large in diameter. The large diameters of the direct drive generators present formidable transportation and assembly challenges, both at the factories and at the wind turbine installation sites. As the wind turbine industry matures and technology improves, larger power ratings will be required to continue the downward push in the cost of energy. Standard power ratings for land-based turbines are expected to be 3 MW or greater in the next few years, and the offshore turbines are expected to be 5 MW or greater.

For the wind turbines to evolve to higher power ratings, conventional approaches typically include an increase in the direct-drive generator diameter or axial (stack) length. Increasing the diameter is preferred from a purely generator electromagnetic perspective, but is not attractive from the transportation, frame, and assembly perspectives, especially for land-based turbines. Increasing the axial length of the generators, while maintaining the diameter to be less than approximately 4 meters, alleviates the land-based transportation issue, but results in complex and costly frame structures with long axial lengths.

In some double-sided direct-drive configurations the stator is fixed by the bolts through the holes in the stator yoke (e.g., see U.S. Pat. No. 7,154,192). The stator yoke is useful, for mechanical reasons, to mechanically link all the poles together and to fix the whole stator to a frame. The drawback in these configurations is that stator yoke adds more material mass into the stator and occupies additional space so that the inner airgap diameter is reduced due to the limited overall generator outside diameter. The resultant generator is heavy and expensive and requires expensive cooling methods.

Accordingly, there is a need for stator configurations resulting in smaller overall size for generators/motors, requiring less material and less expensive cooling techniques, without compromising on the power ratings.

BRIEF DESCRIPTION OF THE INVENTION

Briefly, in accordance with one embodiment, an electrical machine comprising a rotor and a stator is provided. The stator includes a plurality of stator tooth modules configured for radial magnetic flux flow. The stator tooth modules include at least one end plate, and the end plates have extensions for mounting onto a stator frame. The stator is concentrically disposed in relation to the rotor of the electrical machine.

In accordance with another aspect, a wind turbine having an electrical generator comprising a rotor and a stator is provided. The stator includes a plurality of stator tooth modules. The stator tooth modules include at least one end plate, and the end plates have extensions for mounting onto a stator frame. The stator is concentrically disposed in relation to the rotor of the electrical generator.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 1 illustrates a sectional view of a wind turbine including an exemplary direct-drive double-sided permanent magnet (PM) generator according to one embodiment;

DETAILED DESCRIPTION OF THE INVENTION

Figure 3:
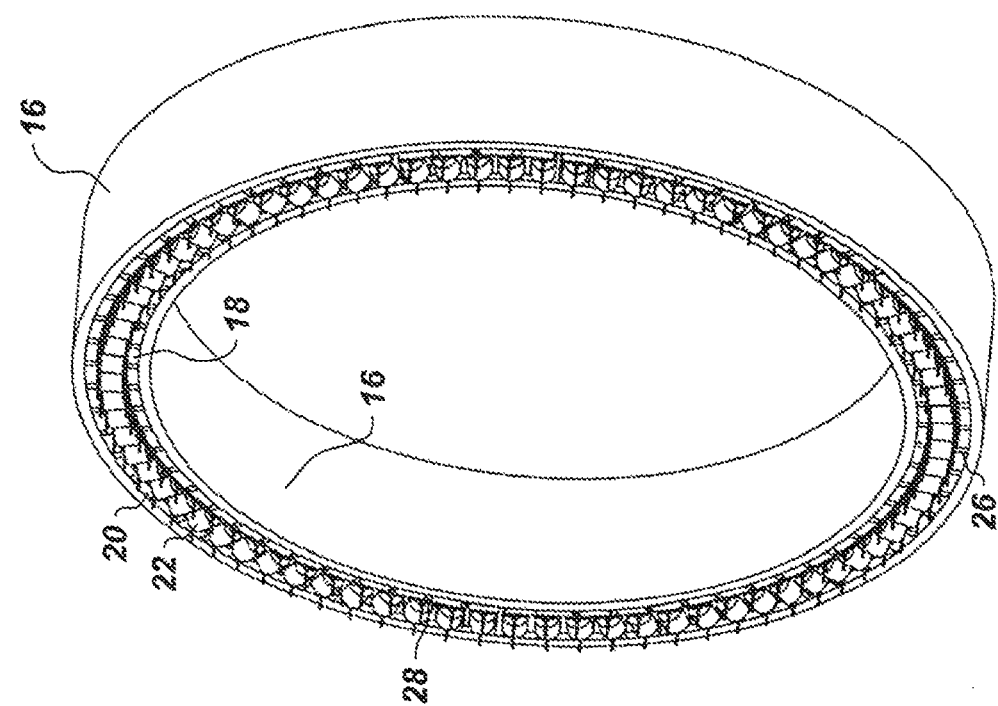
FIG. 3 illustrates a perspective rear end view of the direct-drive double-sided permanent magnet (PM) generator of FIG. 1 with a yokeless stator.

The present invention includes different embodiments for modular-pole double-sided or single-sided electrical machines with yokeless stators that are particularly useful for direct-drive or medium-speed geared wind turbines and ship propulsion motors. The different configurations for wind turbines described herein below are based upon double-sided or single-sided, radial-flux, permanent magnet electrical machines. Although permanent magnet (PM) machines are described and shown for the purpose of illustration, other electrical machines such as wound field synchronous machines, or switched or synchronous reluctance machines can alternatively be used. These configurations contribute towards achieving cost-effective wind turbines of increased power ratings (greater than 2.0 MW) and are especially advantageous for land-based applications where the outside diameter may be constrained by transportation limitations. Although power levels of greater than 2.5 MW are specifically stated, this invention is equally applicable and can be as beneficial for wind turbines of all sizes, including small-medium size wind turbines in the 50 kW to 500 kW range and larger wind turbines of 3 MW and greater.

Turning now to the figures, FIG. 1 is a diagrammatic representation of a sectional view of a wind turbine 10 as an exemplary electrical machine. The wind turbine 10 includes a nacelle 12 and an exemplary embodiment of a direct-drive double-sided PM generator 14. The PM generator 14 of the wind turbine 10 can include at least two concentric air gaps (not shown in FIG. 1 and discussed later in reference to FIG. 2), thereby effectively converting the PM generator 14 into two concentric generators. Thus, it would be appreciated by those skilled in the art that for the same total envelope defined by the outside diameter and axial length, the PM generator 14 can produce considerably more power output than as a single-sided generator. In practice, thus a 2 MW single-sided generator might be replaced by a double-sided generator capable of producing 3 MW to 3.6 MW for the same total diameter and axial length. Equivalently, a 3 MW single-sided PM generator having a diameter of 6 meters might be replaced with a double-sided generator of the same axial length with only a 4.3 meter diameter, thereby enabling land-transportation of the entire generator as one unit. The yokeless configuration of these generators achieves cost-effective wind turbines of increased power ratings (greater than 2.5 MW) based upon direct-drive generators that have a desirable physical envelope.

Referring again to FIG. 1, the PM generator 14 is mounted on a nacelle main frame 110 via a main shaft and bearing assembly 112. The nacelle main frame 110 is further mounted to a tower 140 through a conventional yaw bearing and gear drive system (not shown). More detailed features of the PM generator 14 are described herein below with reference to FIG. 2. A rotor blade hub 116 connects the wind turbine rotor blades 118 to the PM generator 14. A rotor hub cover 120 contains the wind turbine rotor blades 118 and other turbine rotor components. A nacelle cover 122 is also provided and it typically protects the components inside the nacelle from the environment (e.g., wind, rain, snow, etc.).

Figure 2:
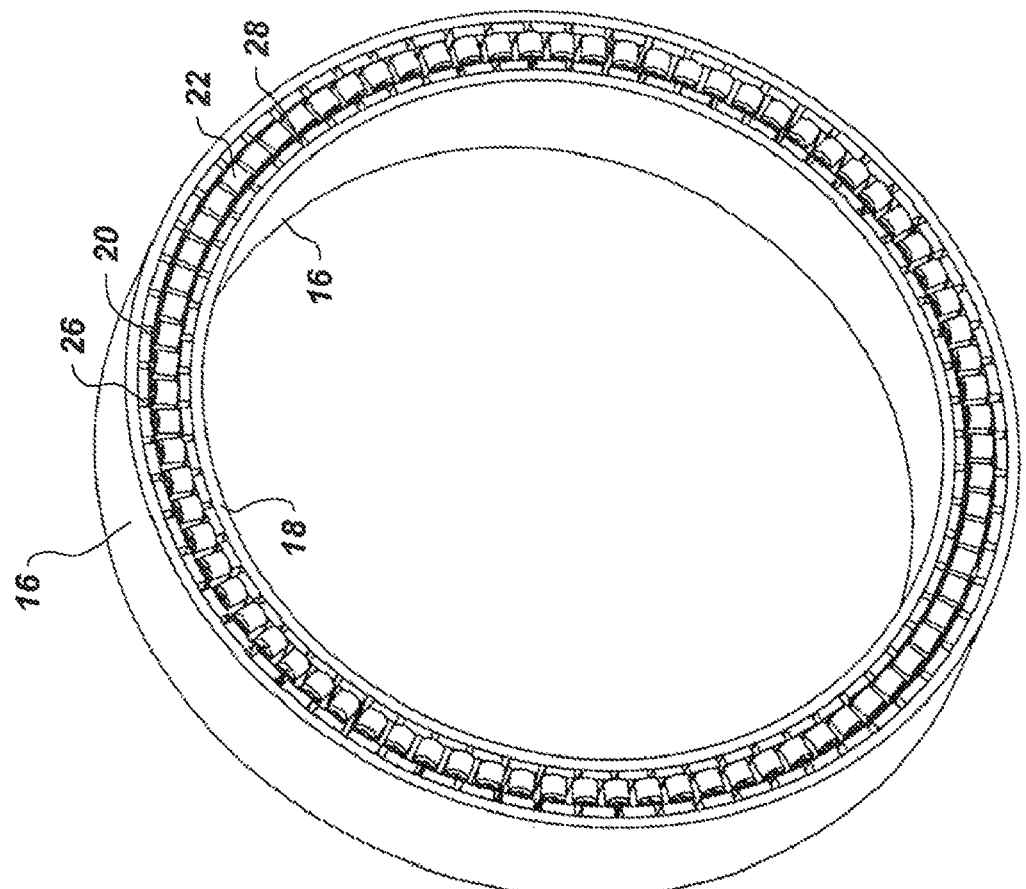
FIG. 2 illustrates a perspective front end view of the direct-drive double-sided permanent magnet (PM) generator of FIG. 1 with a yokeless stator.
Figure 4A:
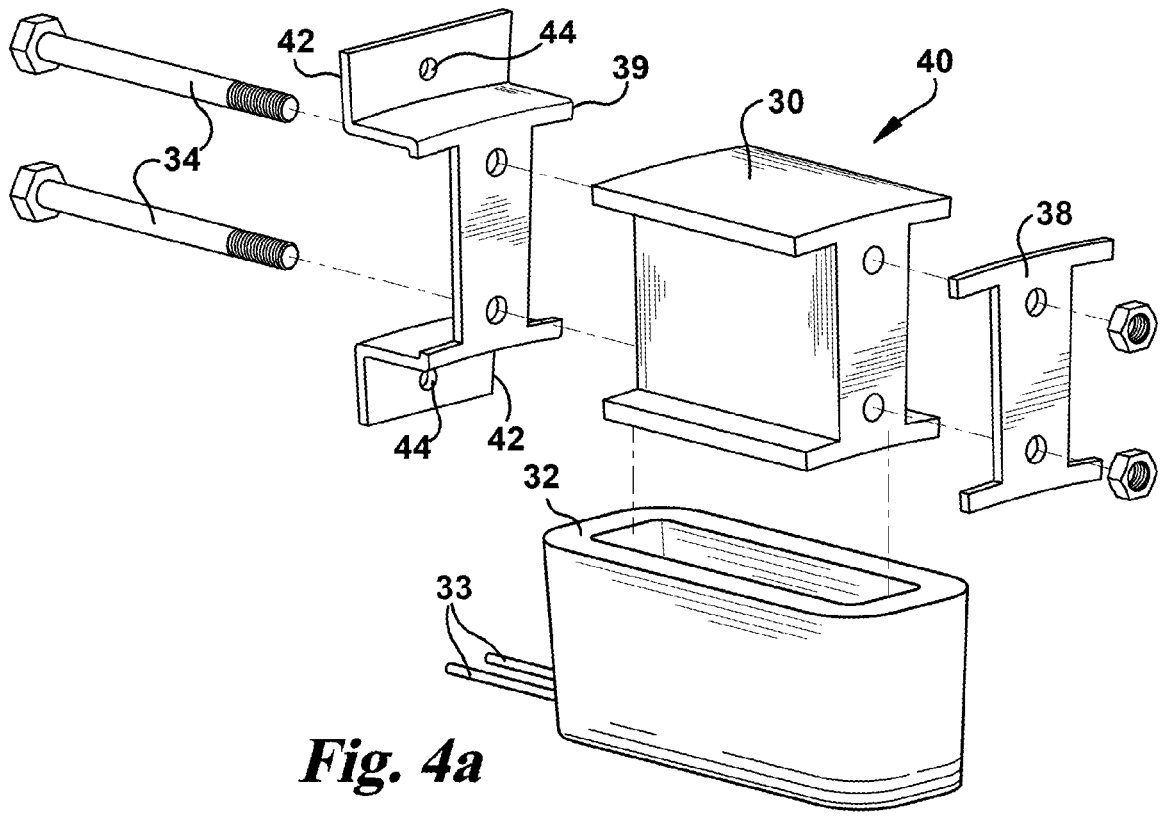
FIG. 4a illustrates an exploded view of an exemplary embodiment for the yokeless stator of FIG. 2 and FIG. 3 with one modular lamination stack.
Figure 4B:
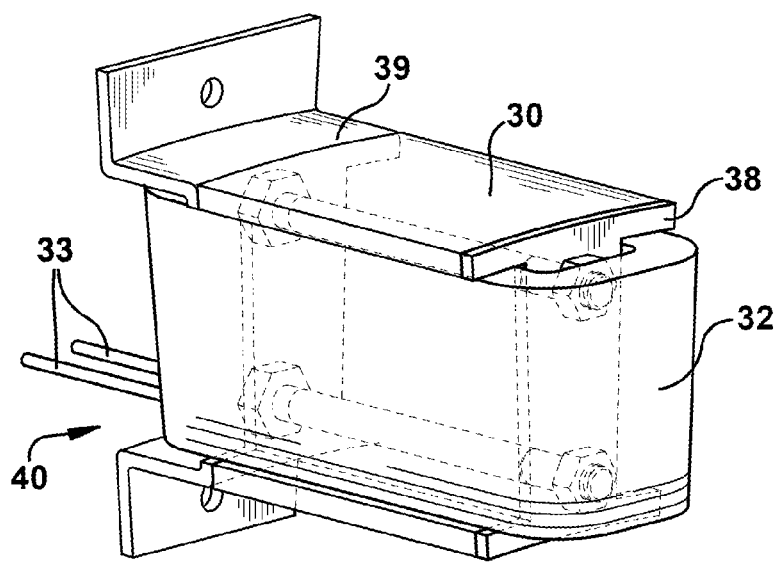
FIG. 4b illustrates a perspective view of an exemplary embodiment for the yokeless stator of FIG. 2 and FIG. 3 with one modular lamination stack.

FIGS. 2 and 3 illustrate the front end and rear end views respectively, of one embodiment of the modular-pole wind turbine generator 14. The generator 14 in FIGS. 2 and 3, includes a rotor 16 with an inner rotor portion 18 and an outer rotor portion 20, and a double-sided yokeless stator 22. The yokeless stator 22 is also concentrically disposed between the inner rotor portion 18 and the outer rotor portion 20 of the wind turbine generator 14. The yoke or back-iron of a stator in a conventional machine is the section of core steel that is designed to carry the circumferential component of magnetic flux that links the stator teeth. The yokeless stator 22 is seen to have no yoke or back-iron section, therefore the inner and outer rotor portions 18 and 20 are designed to carry the circumferential component of the magnetic flux linking the stator teeth. The generator 14 further comprises a stator frame 50 (shown in FIG. 5). The yokeless stator 22 is disposed between two rotating rotor portions 18, 20 inside and outside of the stator, respectively. The rotor portions 18, 20 are shown as, but not limited to, permanent magnet rotors FIGS. 4a and 4b show a view of one stator tooth module 40 for the yokeless stator 22 and its exploded view. The stator 22 includes multiple stator tooth modules 40, in which one or more coils 32 are wound around a respective modular lamination stack 30. In some embodiments, it may be desirable to have a ground-wall insulation layer between the stator coil 32 and the lamination stack 30. Coils 32 may have one or more leads 33 which extend out from the coil and beyond extension 42. In one embodiment, each respective stator tooth module 40, as shown in FIG. 4a, includes stack compression bolts 34 and nuts for compressing the respective modular lamination stack 30, and pre-insulated conductor wire 32. The stack compression bolts 34 and nuts can be preferably of a non-ferromagnetic material such as 300 series stainless steel or a carbon steel with an electrically insulating layer. In a specific embodiment, each stator tooth module 40 includes an I-shaped lamination stack 30. Though two bolts 34 are shown in FIG. 4, additional bolts may be used for each lamination stack 30 to increase mechanical stiffness depending on system requirements.

The stator tooth module 40 further includes end plates 38 and 39 as shown in FIG. 4a, and bolts (not shown) or other fastening means can be used to attach end plate 39 and the respective stator tooth module 40 to the stator frame 50. End plates 38, 39 can have a similar shape as the lamination stack 30, and in some embodiments, have slightly smaller dimensions than lamination stack 30. The slightly smaller dimensions would permit the edges of the end plates 38, 39 to be recessed from the lamination stack, and could prove beneficial at the air gap surfaces. The end plates 38, 39 can have matching holes with respect to lamination stack 30. End plate 39 includes extensions 42 with integral holes 44 that can be used, with suitable fasteners (e.g., bolts) to fasten the stator tooth module 40 to the stator frame 50. In the embodiment illustrated in FIGS. 4a and 4b, one extension 42 has one hole 44, but more than one hole could be used per extension. For example, two or more holes could be placed in each extension 42 for use in fastening (via bolts or other suitable fasteners) end plate 39 to the stator frame 50. Each stator tooth module 40 can under go a vacuum pressure impregnation (VPI) of suitable insulating resin common to large electrical machines prior to mounting. The end plates 38, 39 can be stamped or cut, and then press formed from sheet, plate, or bar stock of either a non-ferromagnetic material such as 300 series stainless steel or a ferromagnetic material such as carbon steel or low-alloy steel. Alternatively, the end plates 38, 39 can be cast from ductile iron.

Figure 5:
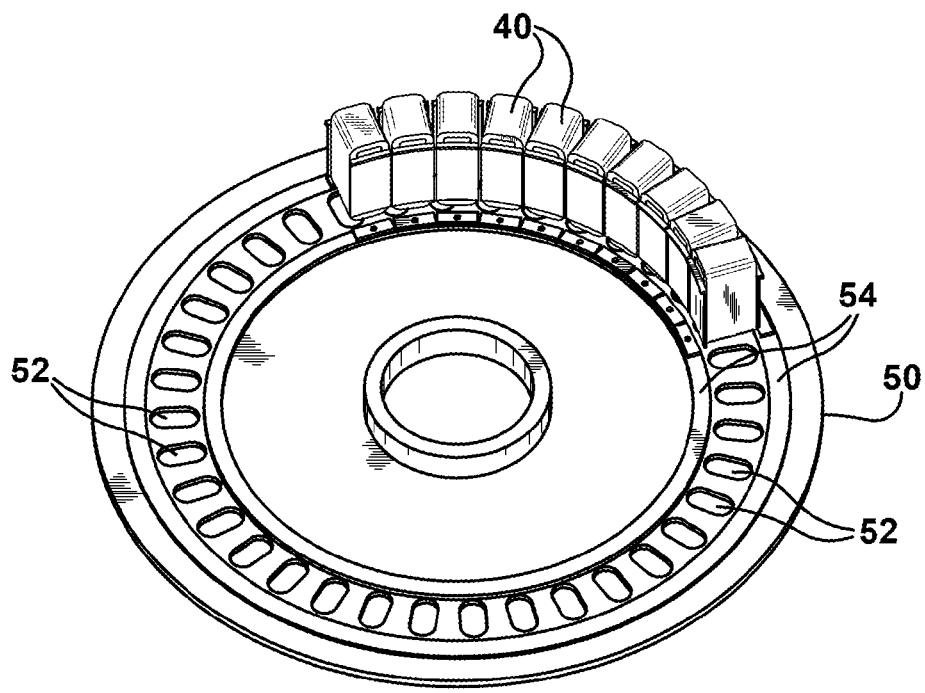
FIG. 5 illustrates a perspective view of an exemplary embodiment of a stator assembly that is partially populated with stator tooth modules.

FIG. 5 illustrates one embodiment of a stator frame 50 partially populated with stator tooth modules 40. The stator frame 50 can be fabricated from steel or cast ductile iron, or other suitable materials. A series of holes 52 are arranged in a circumferential pattern and form lead windows as well as passageways for optional axial air flow for cooling. The leads 33 from the stator coil 32 can be routed through these windows or holes 52. The leads can extend through these windows and allow connection to be made on the "back" side of stator frame 50. If the end plates 39 are of a ferromagnetic material, then preferably one or more spacer rings 54 may be located concentrically with the stator frame 50 to prevent substantial magnetic flux from circulating through the frame 50. The spacer rings 54 may be formed of non-ferromagnetic material (e.g., stainless steel, aluminum, fiber-reinforced plastic), and have holes aligned with the holes 44 located on stator tooth module extensions 42 so that the stator tooth modules 40 may be rigidly attached to stator frame 50. In one embodiment, mounting bolts (not shown) may be formed of non-ferromagnetic material and can be used to attach stator tooth modules 40 through spacer rings 54 to stator frame 50. If the end plates 39 and/or the stator frame 50 are of a non-ferromagnetic material, then the one or more spacer rings 54 may not be required.

Figure 6:
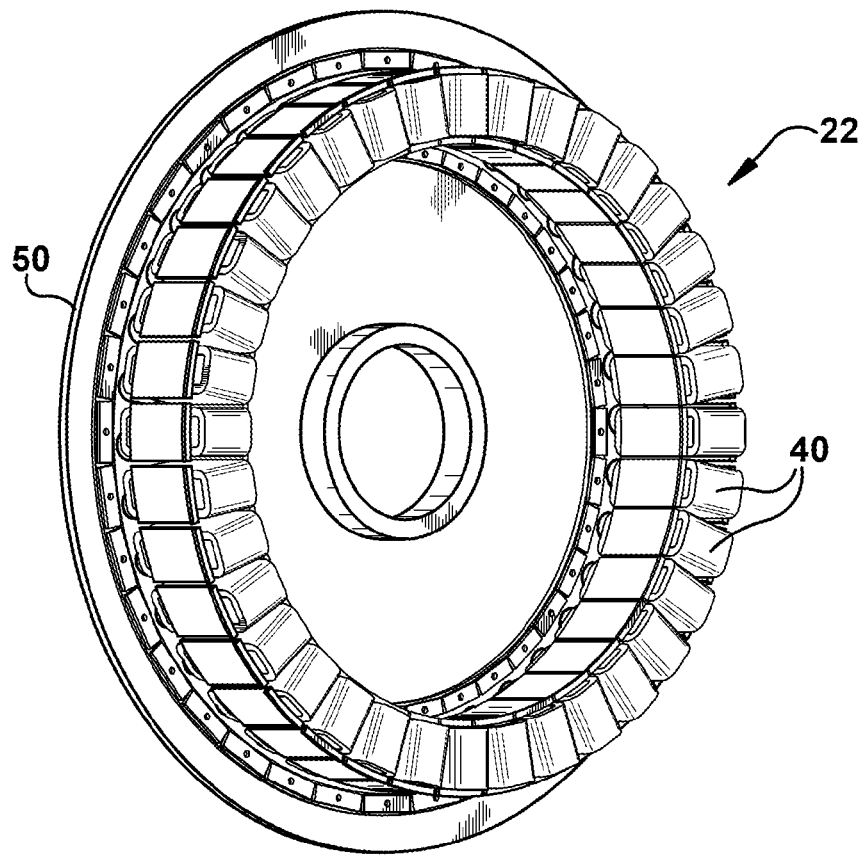
FIG. 6 illustrates a perspective view of an exemplary embodiment of a stator assembly shown fully populated with stator tooth modules.

FIG. 6 illustrates one embodiment of a completed stator 22 for a double-sided machine. The stator 22 could optionally be potted in a resin (e.g. epoxy) to further increase the mechanical stiffness of the stator tooth module assembly is desired. In this case temporary spacers (not shown) could be used to maintain clearances between adjacent coils to permit cooling airflow if desired. The stator 22 could also undergo a global vacuum pressure impregnation (i.e., VPI) to further increase environmental sealing and integrity of the stator winding insulation system, especially at the end connections.

Figure 7:
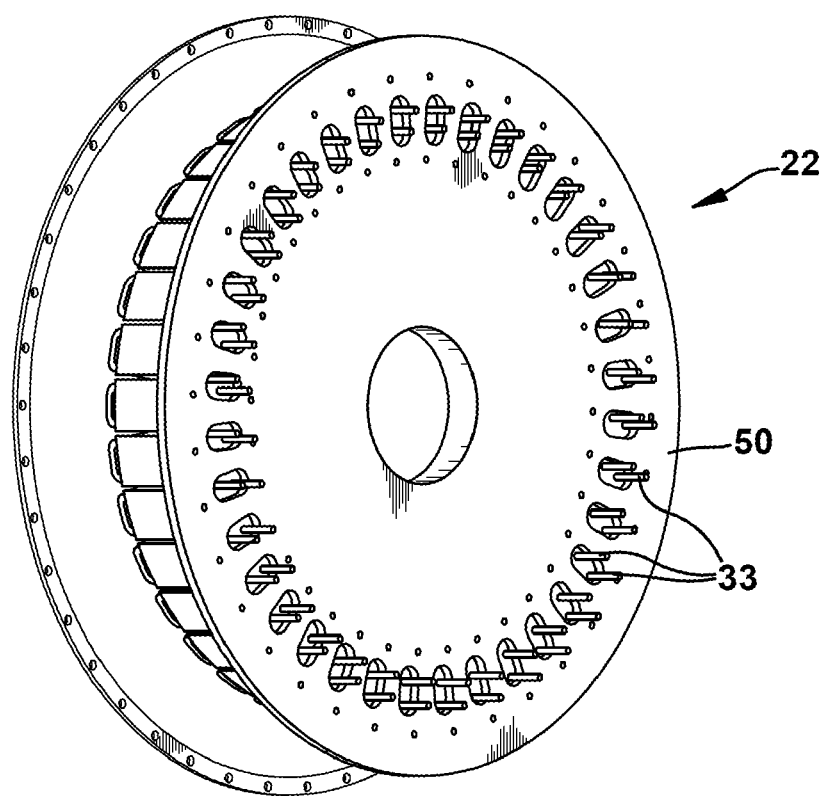
FIG. 7 illustrates a perspective view of an exemplary embodiment showing the connection side of a stator assembly.

FIG. 7 illustrates the "back" side or connection side of the stator 22 with one example of a frame housing. The coil connections, via leads 33, can be made via brazing (or other suitable methods) to a combination of each other and copper rings (not shown) particular to the number of phases, poles and circuits desired or required by the specific application. In the embodiment shown in FIG. 7, the stator 22 has 36 stator tooth modules 40 and would preferably be used in conjunction with a 24-pole rotor to provide ½ slots per pole per phase. A larger and/or slower electrical machine may have more poles and stator tooth modules, for example, for a ½ slots per pole per phase configuration an electrical machine may have 96 slots (stator tooth modules), 64 poles, and 3 phases. Alternative embodiments can include, but are not limited to, ⅖ slots per pole per phase (e.g., 96 slots (stator tooth modules), 80 poles, and 3 phases) and 2/7 slots per pole per phase (e.g., 96 slots (stator tooth modules), 112 poles, and 3 phases).

Figure 8:
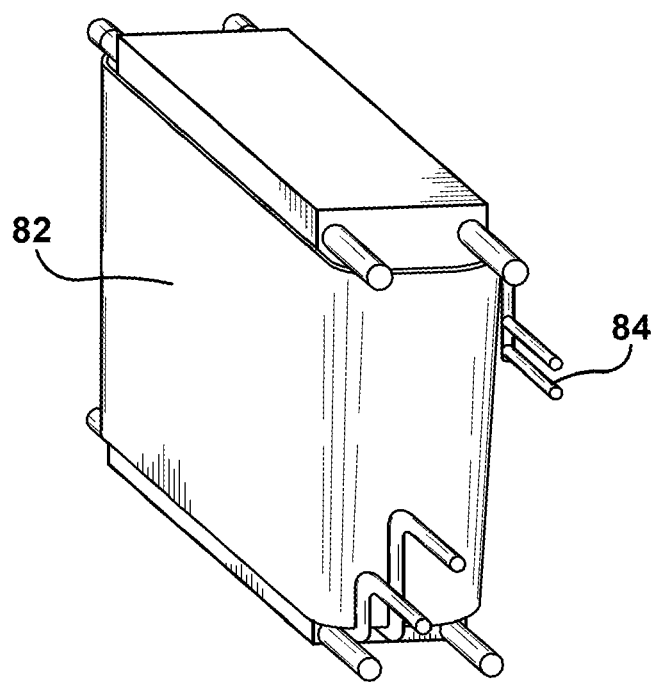
FIG. 8 illustrates another exemplary embodiment of the stator tooth module incorporating a cooling jacket.

FIG. 8 illustrates a stator tooth coil module having water jacket cooling. In one embodiment, the water jacket 82 can comprise copper tubing that is wrapped around the insulated stator coil 32. The copper tubing could be wrapped in a single spiral, a parallel spiral, or other configurations. In the parallel spiral configuration, the mid-point of the copper tubing could be bent 180 degrees such that the inflow and outflow ends 84 of the tubing are adjacent and parallel to each other. The spiral wrapping of the tubing around the stator coil could start at the mid-point. One advantage to this approach is that induced voltages across the length of the copper tubing are reduced. The thermal cooling medium that circulates in jacket 82 could be water, antifreeze, a water/antifreeze mix or any other suitable cooling fluid.

Figure 9:
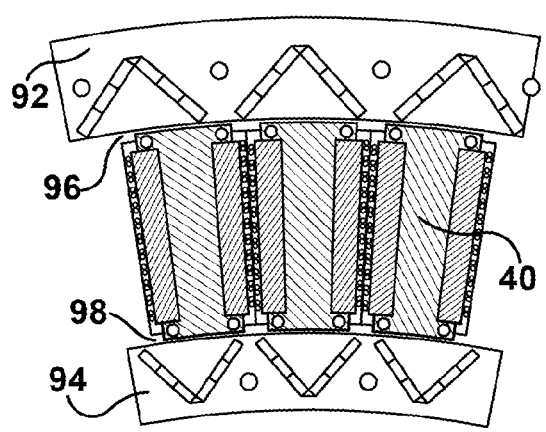
FIG. 9 illustrates a cross-sectional view of an exemplary embodiment of an electrical machine in a double-sided configuration.
Figure 10:
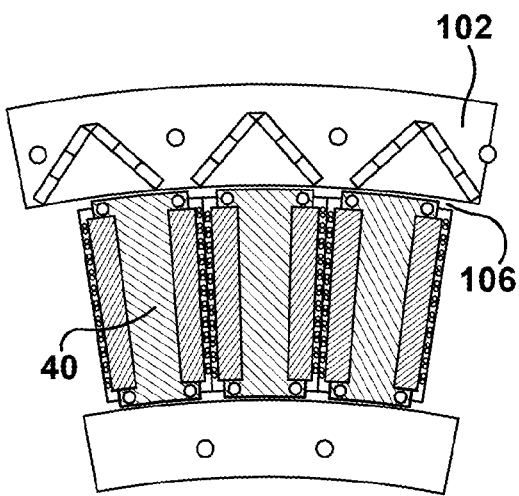
FIG. 10 illustrates a cross-sectional view of another exemplary embodiment of an electrical machine in a single-sided configuration.
Figure 11:
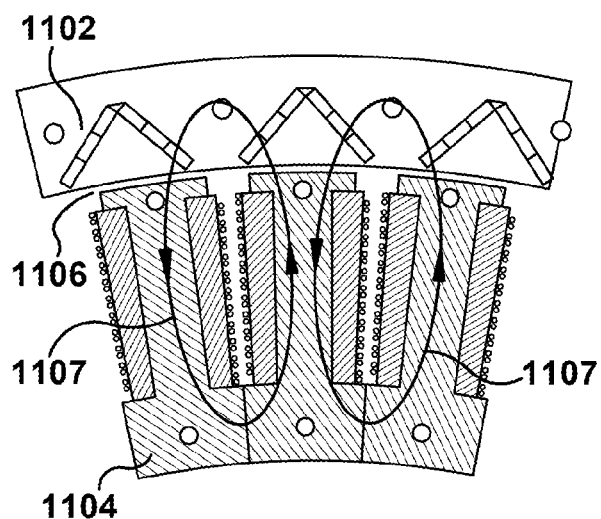
FIG. 11 illustrates a cross-sectional view of another exemplary embodiment of an electrical machine in a single-sided configuration having extended stator tooth overhangs.
Figure 12:
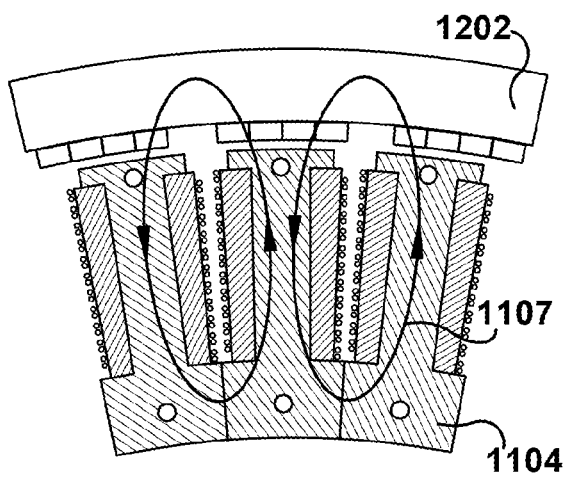
FIG. 12 illustrates a cross-sectional view of another exemplary embodiment of an electrical machine in a single-sided configuration having extended stator tooth overhangs and a surface mounted permanent magnet rotor.

FIGS. 9-12 illustrate partial, cross-sectional views of several embodiments of the present invention having alternative rotor configurations. Each of these embodiments may or may not be used with the optional water jacket cooling (as illustrated in FIG. 8). FIG. 9 illustrates a double-sided configuration having dual interior permanent magnet (IPM) rotors 92, 94 and two airgaps 96, 98. FIG. 10 illustrates a single-sided configuration having a single IPM rotor 102 and one airgap 106. The stator yoke can be formed from a separate stack of laminations that are compressed and bolted, either directly or indirectly, to the stator frame 50. The rotor 102 of FIG. 10 could be located on the inside or outside (as shown) of the stator. Although the stator (as shown in the embodiments of FIGS. 10-12) is no longer yokeless, many of the benefits of the stator tooth modules would still be retained.

FIG. 11 illustrates a single-sided configuration having a single IPM rotor 1102 and one airgap 1106. The stator yoke is integrated into the stator tooth module by extending the tooth "overhangs" such that adjacent stator tooth modules mate along approximately a radial interface line with little to no clearance. The tooth overhangs 1104 are extended (compared to the embodiments shown in FIGS. 9 and 10) in the radial direction to accommodate the magnetic flux that is shared between teeth and that flows in a predominantly circumferential direction (indicated by 1107). FIG. 12 illustrates a similar single-sided configuration to the one shown in FIG. 11. However, rotor 1202 is of the surface mounted permanent magnet type, as opposed to IPM type shown in FIGS. 9-11. In any of the embodiments, the rotors could be of the surface mount type, the interior permanent magnet type or combinations thereof. The rotors 1102 and 1202 of FIGS. 11 and 12 respectively could be located on the inside or outside (as shown) of the stator.

Figure 13:
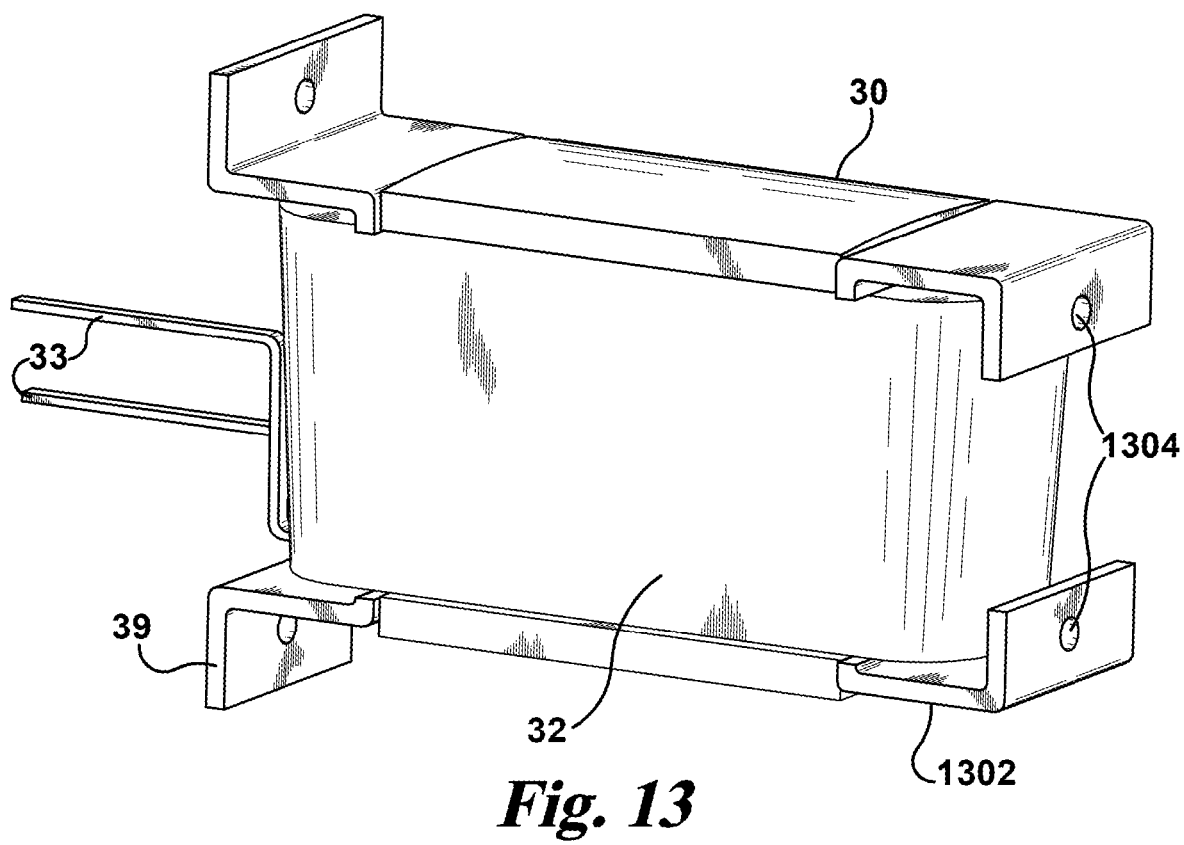
FIG. 13 illustrates a perspective view of another exemplary embodiment of a stator tooth module having a stiffening bracket located on the opposite side from the stator frame mounting bracket.

FIG. 13 illustrates another embodiment of the stator tooth module. In this embodiment, end plate 38 (see FIGS. 4a and 4b) is replaced with end plate 1302. End plate 1302 is configured so that a stiffening ring (not shown) may be attached to the ends thereof. Like end plate 39, end plate 1302 can be preferably stamped or cut, and then press formed from sheet, plate, or bar stock of either a non-ferromagnetic material such as 300 series stainless steel or a ferromagnetic material such as carbon steel or low-alloy steel. Alternatively, the end plate 1302 can be cast from, for example, ductile iron. The stiffening ring is preferably formed of a non-ferromagnetic material and can be attached with suitable fasteners (e.g., non-magnetic bolts) via through holes 1304. The stiffening ring, via endplates 1302, would impart additional hoop, radial and circumferential stiffness to the stator assembly. This could enable stator assemblies of increased axial stack length and/or higher slot and pole numbers. The stiffening ring can be attached via insulated bolts to prevent induced circulating currents, and is preferably formed of a non-ferromagnetic material to prevent additional circulating (i.e., leakage) magnetic flux that could link the stator coils. The stiffening ring can also be of a ferromagnetic material such as carbon or low-alloy steel if the end plate 1302 is of a non-ferromagnetic material and/or non-ferromagnetic spacers are placed between the stiffening ring and the end plate 1302.

In the various generator configurations described herein, the yokeless modular stator results in a smaller generator compared to a double-sided generator with a stator yoke. Since the stator yoke is removed, the inner airgap diameter may be enlarged for a given constant outer rotor outer diameter. Therefore, the inner rotor can produce more torque and power, which permits a shorter stack for a given power generator. And therefore, the overall generator length may be shorter. In some embodiments, the equivalent airgaps for both the inner and outer airgaps are reduced. This is advantageous since for a given airgap flux density, thinner permanent magnets may be used.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A generator comprising:
   a rotor; and
   a stator comprising a plurality of stator tooth modules and configured for radial magnetic flux flow, said stator tooth modules comprising at least one end plate, wherein at least one of said at least one end plate having extensions for mounting onto a stator frame;
   wherein said stator is concentrically disposed in relation to said rotor, and each of the plurality of stator tooth modules are secured to the stator frame by each of the extensions and fastening means.

2. The electrical machine of claim 1, further comprising:
   a cooling jacket disposed around conducting coils of at least one of said stator tooth modules, said cooling jacket carrying a thermal transfer medium for cooling said stator tooth modules.

3. The electrical machine of claim 2, wherein said thermal transfer medium is a liquid.

4. The machine generator of claim 1, wherein said rotor is a single-sided rotor comprising a permanent magnet, and said permanent magnet is located either inside or on the surface of said rotor.

5. The generator of claim 1, further comprising:
   an inner rotor; and
   an outer rotor;
   said stator located between said inner rotor and said outer rotor,
   wherein said stator is a yokeless stator, and said inner rotor and said outer rotor are configured to carry a circumferential component of magnetic flux linking said stator tooth modules.

6. The generator of claim 1, wherein said rotor is a double-sided rotor comprising a permanent magnet.

7. The generator of claim 1, wherein said rotor is a double-sided rotor comprising a permanent magnet, said permanent magnet located on the surface of said rotor.

8. The electrical machine of claim 1, further comprising:
   stiffening means for increasing the stiffness of said stator.

9. The electrical machine of claim 8, wherein said stiffening means is comprised of a resinous material that is configured to encapsulate said stator tooth modules.

10. The electrical machine of claim 8, wherein said stiffening means is comprised of at least one bracket attached to at least some of said stator tooth modules and a ring which is configured to be fastened to said at least one bracket, said at least one bracket and said ring providing increased stiffness and rigidity to said stator.

11. The generator of claim 1, further comprising:
    a cooling jacket disposed around conducting coils of at least one of said stator tooth modules, said cooling jacket carrying a thermal transfer medium for cooling said stator tooth modules.

12. The generator of claim 11, wherein said thermal transfer medium is a liquid.

13. The generator of claim 1, further comprising:
    a resin applied to the stator for increasing the stiffness of said stator.

14. The generator of claim 13, wherein said resin is comprised of a resinous material that is configured to encapsulate said stator tooth modules.

15. The generator of claim 1, further comprising:
    at least one bracket attached to at least some of said stator tooth modules and a ring which is configured to be fastened to said at least one bracket, said at least one bracket and said ring providing increased stiffness and rigidity to said stator.

16. A wind turbine comprising an electrical generator, the wind turbine comprising:
    a generator rotor; and
    a generator stator comprising a plurality of stator tooth modules, the stator tooth modules comprising at least one end plate, at least one of the at least one end plate having extensions for mounting onto a stator frame;
    wherein the generator stator is concentrically disposed in relation to the generator rotor, and each of the plurality of stator tooth modules is attached to the stator frame by each of the extensions and fastening means.

17. The wind turbine of claim 16, further comprising:
    a cooling jacket disposed around conducting coils of at least one of said stator tooth modules, said cooling jacket carrying a thermal transfer medium for cooling said stator tooth modules.

18. The wind turbine of claim 17, wherein said thermal transfer medium is a liquid.

19. The wind turbine of claim 16, wherein said rotor is a single-sided rotor comprising a permanent magnet, and said permanent magnet is located either inside or on the surface of said rotor.

20. The wind turbine of claim 16, wherein said rotor comprises an inner rotor and an outer rotor, and said stator being located between said inner rotor and said outer rotor, wherein said stator is a yokeless stator, and said inner rotor and said outer rotor are configured to carry a circumferential component of magnetic flux linking said stator tooth modules.

21. The wind turbine of claim 16, wherein said rotor is a double-sided rotor comprising a permanent magnet.

22. The wind turbine of claim 16, wherein said rotor is a double-sided rotor comprising a permanent magnet, said permanent magnet located on the surface of said rotor.

23. The wind turbine of claim 16, further comprising:
    a resin for increasing the stiffness of said stator, said resin located on each of said stator tooth modules.

24. The wind turbine of claim 23, wherein said resin is comprised of a resinous material that is encapsulated on each of said stator tooth modules.

25. The wind turbine of claim 16, further comprising:
    at least one bracket attached to at least one of said stator tooth modules, and a ring which is configured to be fastened to said at least one bracket, said at least one bracket and said ring providing increased stiffness and rigidity to said stator.

* * * * *